(12) United States Patent
Webb et al.

(10) Patent No.: US 6,186,741 B1
(45) Date of Patent: Feb. 13, 2001

(54) AIRFOIL COMPONENT HAVING INTERNAL COOLING AND METHOD OF COOLING

(75) Inventors: Alan L. Webb, West Chester; Anne M. Isburgh, Loveland, both of OH (US)

(73) Assignee: General Electric Company, Cincinnati, OH (US)

(*) Notice: Under 35 U.S.C. 154(b), the term of this patent shall be extended for 0 days.

(21) Appl. No.: 09/359,479

(22) Filed: Jul. 22, 1999

(51) Int. Cl.⁷ .................................................. F01D 5/18
(52) U.S. Cl. ........................ 416/96 R; 416/97 R; 416/1; 415/115
(58) Field of Search ................................. 415/115, 114; 416/97 R, 96 R, 1, 95, 97 A, 92

(56) References Cited

U.S. PATENT DOCUMENTS

| | | | |
|---|---|---|---|
| 4,236,870 | * 12/1980 | Hucul, Jr. et al. | 416/97 R |
| 4,529,357 | * 7/1985 | Holland | 416/96 R |
| 4,820,123 | * 4/1989 | Hall | 416/92 |
| 5,403,156 | * 4/1995 | Arness et al. | 416/97 R |
| 5,403,157 | * 4/1995 | Moore | 416/97 R |
| 5,997,251 | * 12/1999 | Lee | 416/97 R |

* cited by examiner

*Primary Examiner*—Edward K. Look
*Assistant Examiner*—Richard Woo
(74) *Attorney, Agent, or Firm*—Andrew C. Hess; Rodney M. Young

(57) ABSTRACT

The flow of cooling fluid through a core tie hole formed between a pair of internal cooling passageways of an airfoil component is reduced by providing a restriction that meters coolant flow through the inlet passage of one of the passageways so that the pressures in the two passageways are equalized, thereby minimizing the flow of cooling fluid through the hole. The restriction can be a metering plate disposed at the entrance of the inlet passage or a restriction integrally formed in the inlet passage.

12 Claims, 2 Drawing Sheets

AIRFOIL COMPONENT HAVING INTERNAL COOLING AND METHOD OF COOLING

BACKGROUND OF THE INVENTION

The present invention relates generally to gas turbine engines, and more particularly to internally cooled airfoils used in such engines.

Gas turbine engines, such as aircraft jet engines, include many components (e.g., turbines, compressors, fans and the like) that utilize airfoils. Turbine airfoils, such as turbine blades and nozzle vanes, which are exposed to the highest operating temperatures, typically employ internal cooling to keep the airfoil temperatures within certain design limits. A turbine rotor blade, for example, has a shank portion that is attached to a rotating turbine rotor disk and an airfoil blade portion which is employed to extract useful work from the hot gases exiting the engine's combustor. The airfoil is attached to the shank and includes a blade tip that is the free end of the airfoil blade. Typically, the airfoil of the turbine rotor blade is cooled by air (normally bled from the engine's compressor) passing through an internal circuit, with the air entering the airfoil through the shank and exiting through airfoil tip holes, airfoil film cooling holes and blade trailing edge slots or holes. Known turbine blade cooling circuits include a plurality of radially-oriented passageways that are series-connected to produce a serpentine flow path, thereby increasing cooling effectiveness by extending the length of the coolant flow path. It is also known to provide additional, unconnected passageways adjacent to the serpentine cooling circuit.

Turbine rotor blades with internal cooling circuits are typically manufactured using an investment casting process commonly referred to as the lost wax process. This process comprises enveloping a ceramic core defining the internal cooling circuit in wax shaped to the desired configuration of the turbine blade. The wax assembly is then repeatedly dipped into a liquid ceramic solution such that a hard ceramic shell is formed thereon. Next, the wax is melted out of the shell so that the remaining mold consists of the internal ceramic core, the external ceramic shell and the space therebetween, previously filled with wax. The empty space is then filled with molten metal. After the metal cools and solidifies, the external shell is broken and removed, exposing the metal that has taken the shape of the void created by the removal of the wax. The internal ceramic core is dissolved via a leaching process. The metal component now has the desired shape of the turbine blade with the internal cooling circuit.

In casting turbine blades with serpentine cooling circuits, the internal ceramic core is formed as a serpentine element having a number of long, thin branches. This presents the challenge of making the core sturdy enough to survive the pouring of the metal while maintaining the stringent requirements for positioning the core. Furthermore, the thin branches of the serpentine core can experience relative movement if not stabilized in some manner. Thus, core ties (i.e., small ceramic connectors between various branches) are used to strengthen the core. This prevents relative movement of the core branches such that the airfoil external wall thicknesses are controlled better. After casting, when they have been removed along with the core, the core ties leave holes in the ribs or walls separating adjacent passageways. These core tie holes provide unwanted flow communication between adjacent passageways if a pressure differential exists between the two passageways. That is, cooling fluid in the higher pressure passageway will flow into the lower pressure passageway through the core tie hole. This will result in an undesirable cooling flow distribution compared to the original design intent.

Accordingly, there is a need for an airfoil component in which cooling fluid flow through core tie holes is minimized.

SUMMARY OF THE INVENTION

The above-mentioned needs are met by the present invention which provides an airfoil component comprising at least two internal cooling passageways separated by a rib having a core tie hole formed therein. A means for metering flow through the inlet passage of one of the passageways is provided so that the pressures in the two passageways are substantially equal. This reduces the flow of cooling fluid through the core tie hole.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
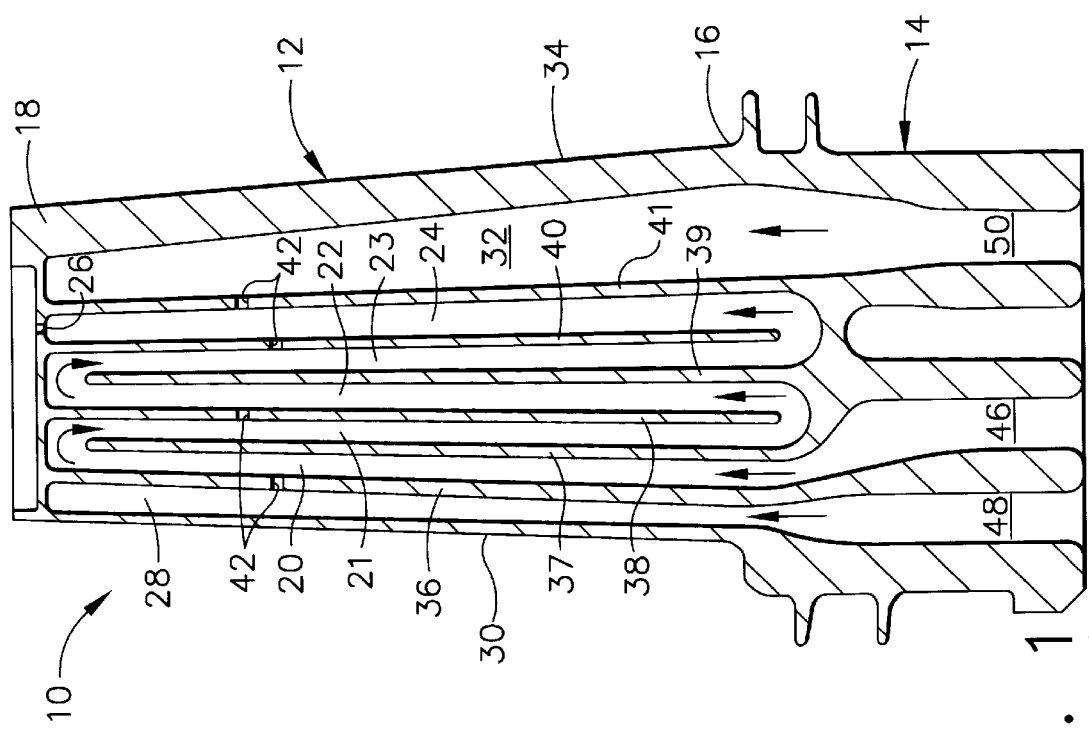
FIG. 1 is a longitudinal cross-sectional view of a prior art turbine blade.

Referring to the drawings wherein identical reference numerals denote the same elements throughout the various views, FIG. 1 shows a prior art gas turbine engine rotor blade 10 having a hollow airfoil 12 and an integral shank 14 for mounting the airfoil 12 to a rotor disk (not shown) in a conventionally known manner. The airfoil 12 extends longitudinally or radially upwardly from a blade platform 16 disposed at the top of the shank 14 to a blade tip 18. The airfoil 12 includes an internal serpentine cooling circuit having five series-connected, generally radially extending cooling passageways 20–24.

The first passageway 20 receives a cooling fluid (usually a portion of relatively cool compressed air bled from the compressor (not shown) of the gas turbine engine) through a first inlet passage 46 in the shank 14. The cooling fluid travels radially outwardly through the first passageway 20, passes into the second passageway 21 and then flows radially inwardly through the second passageway 21. From there, the cooling fluid similarly passes in series through the other passageways 22–24, thereby cooling the airfoil 12 from the heating effect of the combustion gases flowing over the outer surfaces thereof. As is known, the cooling fluid exits the airfoil 12 through film cooling holes (not shown) and an opening 26 in the blade tip 18.

The airfoil 12 includes a leading edge cooling passageway 28 in addition to the serpentine cooling circuit. The leading edge passageway 28 extends radially between the airfoil leading edge 30 and the first passageway 20 and is not connected to the serpentine cooling circuit. A separate flow of cooling fluid is introduced through a second inlet passage 48 in the shank 14. The cooling fluid flows radially through the leading edge passageway 28 and is discharged from the airfoil 12 through conventional film cooling holes and/or a tip hole (not shown) formed through the exterior wall of the airfoil 12. Similarly, a radially extending trailing edge cooling passageway 32 is disposed between the airfoil trailing edge 34 and the fifth passageway 24 of the serpentine cooling circuit. The trailing edge passageway 32 is also not connected to the serpentine cooling circuit and receives another separate flow of cooling fluid through a third inlet passage 50 in the shank 14. This cooling fluid flows radially through the trailing edge passageway 32 and is discharged from the airfoil 12 through a conventional row of trailing edge film holes or slots and/or a tip hole (not shown). The arrows in FIG. 1 indicate the various paths of cooling fluid flow.

As seen in FIG. 1, each one of the passageways 20–24, 28, 32 is separated from adjacent passageways by six radially extending ribs 36–41. That is, the leading edge passageway 28 and the first passageway 20 of the serpentine cooling circuit are separated by a first rib 36, the first passageway 20 and the second passageway 21 are separated by a second rib 37, and so on. At least some of the ribs 36–41 have a core tie hole 42 formed therein due to the use of core ties in the casting process. Specifically, the prior art blade 10 of FIG. 1 has core tie holes 42 formed in the first rib 36, the third rib 38, the fifth rib 40 and the sixth rib 41, although other configurations are possible depending on how the core ties are deployed during the casting process. Core tie holes, which are often elliptical in cross-section, typically have an equivalent diameter of about 0.03–0.1 inches.

The cooling fluid, which is typically air bled from the compressor, is supplied to each of the three inlet passages 46,48,50 at the same pressure. However, the cooling fluid pressure in the passageways 20–24 tends to decrease along the serpentine flow path due to friction and turning losses in the five pass serpentine circuit. The first passageway 20, the leading edge passageway 28 and the trailing edge passageway 32, which are all directly connected to a corresponding one of the inlet passages 46,48,50, all have substantially the same pressure, but the pressure in the fifth passageway 24, the last pass of the serpentine circuit, will be substantially less. Accordingly, there is a pressure differential between the fifth passageway 24 and the adjacent trailing edge passageway 32, which is a single pass circuit not subject to the same pressure loss as the five pass serpentine circuit. Because of this pressure differential, cooling fluid will pass from the trailing edge passageway 32 to the fifth passageway 24 through the core tie hole 42 in the sixth rib 41, starving the tip region of the trailing edge passageway 32 of cooling fluid.

Figure 2:
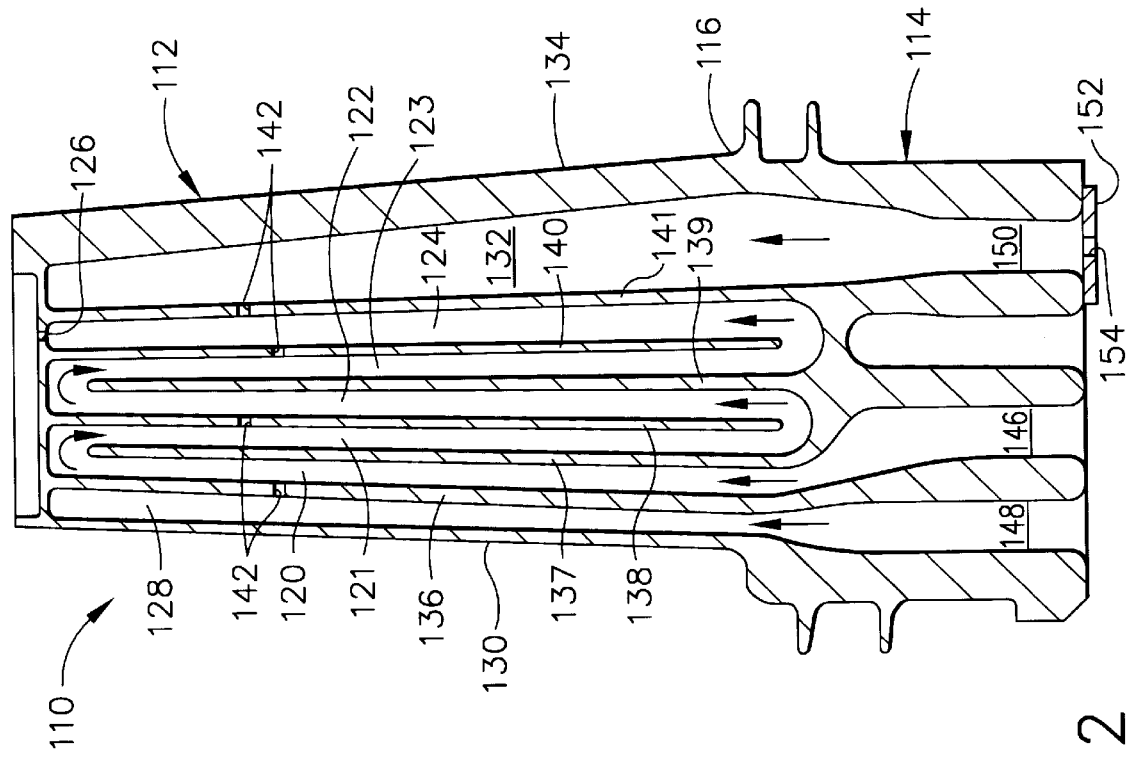
FIG. 2 is a longitudinal cross-sectional view of a turbine blade in accordance with a first embodiment of the present invention.

Referring now to FIG. 2, a turbine blade 110 is shown in which cooling fluid flow through core tie holes is minimized. For purposes of illustration only, the blade 110 has the same cooling circuit configuration as the blade 10 of FIG. 1. However, it should be noted that the present invention is applicable to turbine blades having other cooling circuit configurations. Furthermore, the present invention is not limited to turbine blades and could be used with other types of airfoil components such as turbine nozzles. As will become apparent from the following description, the present invention is applicable to any airfoil component having individually fed cooling passageways that are short-circuited by core tie holes.

The blade 110 has a hollow airfoil 112 and an integral shank 114. The airfoil 112 includes a serpentine cooling circuit having five series-connected, generally radially extending cooling passageways 120–124, a leading edge cooling passageway 128 extending radially between airfoil leading edge 130 and the first passageway 120, and a radially extending trailing edge cooling passageway 132 disposed between airfoil trailing edge 134 and the fifth passageway 124. The first passageway 120 is supplied with cooling fluid through a first inlet passage 146 in the shank 114, the leading edge passageway 128 is supplied with cooling fluid through a second inlet passage 148 in the shank 114, and the trailing edge passageway 132 is supplied with cooling fluid through a third inlet passage 150. Each one of the passageways 120–124, 128,132 is separated from adjacent passageways by six radially extending ribs 136–141. A core tie hole 142 is formed in the first rib 136, the third rib 138, the fifth rib 140 and the sixth rib 141, although other configurations are possible depending on how the core ties are deployed during the casting process.

The blade 110 includes a root metering plate 152 disposed on the radially inner surface of the shank 114 so as to completely cover the third inlet passage 150. The metering plate 152 is a thin plate of any suitable material attached to the shank 114 by an appropriate means such as brazing. A metering hole 154 is formed in the metering plate 152 to allow a metered flow of cooling fluid to pass into the third inlet passage 150. The cross-sectional area of the metering hole 154 is smaller than the cross-sectional area of the third inlet passage 150. Thus, the metering hole 154 presents a restriction at the entrance of the third inlet passage 150 that causes a pressure drop such that the pressure in the trailing edge passageway 132 is less than what it would be without the metering plate 152.

The size of the metering hole 154 is selected to meter the cooling fluid flow through the third inlet passage 150 such that the pressure in the trailing edge passageway 132 is substantially equal to the pressure in the fifth passageway 124, thereby minimizing the pressure differential across the core tie hole 142 in the sixth rib 141. The specific size of the metering hole 154 to achieve this result will be dependent on the overall cooling fluid flow level and the pressure differential that would exist between the trailing edge passageway 132 and the fifth passageway 124 without the metering plate 152. By minimizing the pressure differential across the core tie hole 142 in the sixth rib 141, the present invention lessens the adverse impact of the core tie hole 142 on the effectiveness of the airfoil cooling scheme.

Figure 3:
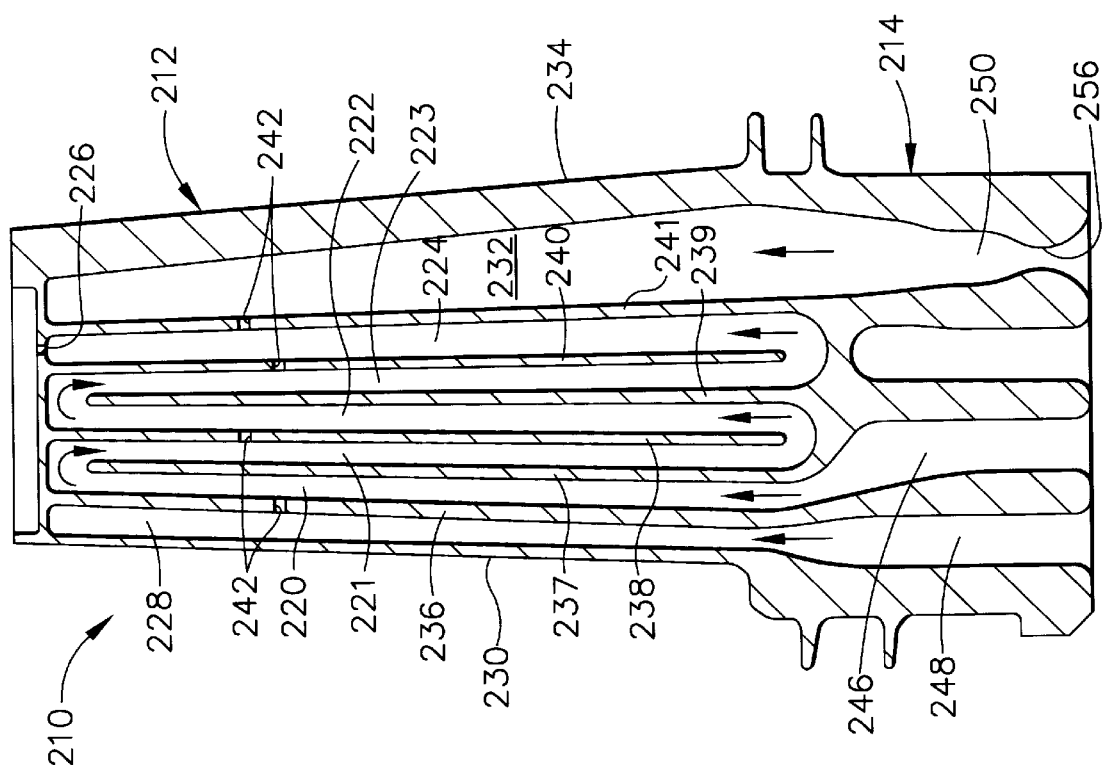
FIG. 3 is a longitudinal cross-sectional view of a turbine blade in accordance with a second embodiment of the present invention.

Turning to FIG. 3, an alternative embodiment of the present invention is shown in the form of a turbine blade 210. For purposes of illustration only, the blade 210 is similar to the blade 110 of FIG. 2, although, as before, it should be noted that this alternative embodiment of the present invention is applicable to turbine blades having other cooling circuit configurations as well as other types of airfoil components.

The blade 210 is similar to the blade 110 of FIG. 2 in that it has a hollow airfoil 212 and an integral shank 214. The airfoil 212 includes a serpentine cooling circuit having five series-connected, generally radially extending cooling passageways 220–224, a leading edge cooling passageway 228 extending radially between airfoil leading edge 230 and the first passageway 220, and a radially extending trailing edge cooling passageway 232 disposed between airfoil trailing edge 234 and the fifth passageway 224. The first passageway 220 is supplied with cooling fluid through a first inlet passage 246 in the shank 214, the leading edge passageway 228 is supplied with cooling fluid through a second inlet passage 248 in the shank 214, and the trailing edge passageway 232 is supplied with cooling fluid through a third inlet passage 250. Each one of the passageways 220–224, 228, 232 is separated from adjacent passageways by six radially extending ribs 236–241. A core tie hole 242 is formed in the first rib 236, the third rib 238, the fifth rib 240 and the sixth rib 241, although other configurations are possible depending on how the core ties are deployed during the casting process.

The blade 210 differs from the blade 110 of FIG. 2 in that it has no metering plate. Instead, a restriction 256 is formed in the third inlet passage 250. Preferably, the restriction 256 is cast as an integral part of the blade 210. The restriction 256 presents a reduced cross-sectional area so as to cause a pressure drop such that the pressure in the trailing edge passageway 232 is less than what it would be if the restriction 256 was omitted.

Like the metering hole 154 of FIG. 2, the size of the restriction 256 is selected to meter the cooling fluid flow through the third inlet passage 250 such that the pressure in the trailing edge passageway 232 is substantially equal to the pressure in the fifth passageway 224, thereby minimizing the pressure differential across the core tie hole 242 in the sixth rib 241. The specific size of the restriction 256 to achieve this result will be dependent on the overall cooling fluid flow level and the pressure differential that would exist between the trailing edge passageway 232 and the fifth passageway 224 without the restriction 256. By minimizing the pressure differential across the core tie hole 242 in the sixth rib 241, the present invention lessens the adverse impact of the core tie hole 242 on the effectiveness of the airfoil cooling scheme.

The foregoing has described a turbine airfoil component in which cooling fluid flow through a core tie hole is minimized. While specific embodiments of the present invention have been described, it will be apparent to those skilled in the art that various modifications thereto can be made without departing from the spirit and scope of the invention as defined in the appended claims.

What is claimed is:

1. An airfoil component comprising:
   a first internal cooling passageway having an inlet passage;
   a second internal cooling passageway;
   a rib separating said first and second passageways, said rib having at least one hole formed therein; and
   means for metering flow through said inlet passage so that the pressure in said first passageway is substantially equal to the pressure in said second passageway.

2. The airfoil component of claim 1 wherein said means for metering flow through said inlet passage comprises a metering plate covering said inlet passage, said metering plate having a metering hole formed therein.

3. The airfoil component of claim 2 wherein the cross-sectional area of said metering hole is smaller than the cross-sectional area of said inlet passage.

4. The airfoil component of claim 1 wherein said means for metering flow through said inlet passage comprises a restriction formed in said inlet passage.

5. An airfoil component comprising:
   a first cooling passageway having an inlet passage;
   an internal serpentine cooling circuit having a plurality of series connected passageways concluding in a final passageway, said final passageway having a smaller pressure than the other ones of said plurality of passageways;
   a rib separating said first passageway and said final passageway, said rib having at least one hole formed therein; and
   means for metering flow through said inlet passage so that the pressure in said first passageway is substantially equal to the pressure in said final passageway.

6. The airfoil component of claim 5 wherein said means for metering flow through said inlet passage comprises a metering plate covering said inlet passage, said metering plate having a metering hole formed therein.

7. The airfoil component of claim 6 wherein the cross-sectional area of said metering hole is smaller than the cross-sectional area of said inlet passage.

8. The airfoil component of claim 5 wherein said means for metering flow through said inlet passage comprises a restriction formed in said inlet passage.

9. The airfoil component of claim 5 further comprising a trailing edge, said first cooling passageway being disposed between said trailing edge and said final passageway.

10. A method of cooling an airfoil component having at least two internal cooling passageways separated by a rib having at least one hole formed therein, said method comprising metering flow into one of said passageways so that the pressures in said two passageways are substantially equal.

11. The method of claim 10 wherein said flow into said one of said two passageways is metered by placing a metering plate having a metering hole formed therein over an inlet passage to said one of said two passageways.

12. The method of claim 10 wherein said flow into said one of said two passageways is metered by forming a restriction in an inlet passage to said one of said two passageways.

* * * * *